United States Patent
Wynn

(10) Patent No.: US 11,455,716 B2
(45) Date of Patent: Sep. 27, 2022

(54) IMAGE ANALYSIS OF APPLIED ADHESIVE WITH FLUORESCENCE ENHANCEMENT

(71) Applicant: Rivian IP Holdings, LLC, Plymouth, MI (US)

(72) Inventor: Nathaniel Christopher Wynn, Newport Beach, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 18 days.

(21) Appl. No.: 16/190,114

(22) Filed: Nov. 13, 2018

(65) Prior Publication Data

US 2020/0151861 A1    May 14, 2020

(51) Int. Cl.
*G01N 21/956* (2006.01)
*C09J 5/00* (2006.01)
(Continued)

(52) U.S. Cl.
CPC .............. *G06T 7/001* (2013.01); *C09J 5/00* (2013.01); *C09J 11/00* (2013.01); *G06T 7/50* (2017.01);
(Continued)

(58) Field of Classification Search
CPC .......... A61K 6/30; A61K 6/887; A61K 6/891; A61K 6/40; A61K 6/889; A61K 6/849; B32B 7/12; B32B 27/08; B32B 27/36; B32B 27/20; B32B 27/32; B32B 2307/412; B32B 27/06; B32B 2270/00; B32B 27/304; B32B 27/40; B32B 2307/4026; B32B 2307/41; B32B 2307/416; B32B 27/306;
(Continued)

(56) References Cited

U.S. PATENT DOCUMENTS 3,740,467 A * 6/1973 Kubo ............... G01N 21/95607
348/129
4,724,302 A * 2/1988 Penney ............... B23K 9/0956
156/350
(Continued)

FOREIGN PATENT DOCUMENTS

CA        3 021 480        12/2017
CN        107528013 A  *  12/2017   ........ H01M 10/0404
WO     WO 2016191648        12/2016

OTHER PUBLICATIONS

FI 20185610 filed Jul. 2, 2018 which is foreign priority of Herranen et al. US2020/0005105 A1, 73 pages. (Year: 2018).*
(Continued)

*Primary Examiner* — Matthew C Bella
*Assistant Examiner* — Dennis Rosario
(74) *Attorney, Agent, or Firm* — Haley Guiliano LLP

(57) ABSTRACT

Systems and methods are described herein for analyzing the application of adhesives. An adhesive comprising a fluorescent property is applied to a component. The component is illuminated using one or more of wavelengths of light from a light source, wherein the adhesive is configured to absorb the one or more wavelengths of light and fluoresce in response. An image of the component is captured using a camera while the component is illuminated using the light source. One or more fluorescence characteristics from the image are determined and a state of the applied adhesive is determined based on the one or more fluorescence characteristics.

19 Claims, 5 Drawing Sheets

(51) Int. Cl.
*G06T 7/62* (2017.01)
*G06T 7/00* (2017.01)
*G06T 7/50* (2017.01)
*G06T 7/90* (2017.01)
*G06T 7/70* (2017.01)
*C09J 11/00* (2006.01)

(52) U.S. Cl.
CPC .................. *G06T 7/62* (2017.01); *G06T 7/70* (2017.01); *G06T 7/90* (2017.01); *C09J 2301/416* (2020.08); *G01N 2021/95615* (2013.01); *G06T 2207/10064* (2013.01); *G06T 2207/30108* (2013.01)

(58) Field of Classification Search
CPC ............ B32B 2260/046; Y10T 428/28; Y10T 428/2848; Y10T 156/10; Y10T 29/49826; Y10T 428/14; Y10T 428/24901; Y10T 428/1467; Y10T 156/00; C09J 7/29; C09J 5/00; G01N 21/6428; G01N 21/643; G01N 21/6456; G01N 2021/95638; G01N 2021/6419; G01N 2021/6421; G01N 21/95; G01N 21/9515; G01N 2021/9516; G01N 2021/9518; G01N 21/95607; G01N 2021/95615; G01N 21/956; G01N 21/88; G01N 21/91; G01N 21/952; G01N 21/64; G01N 21/6447; G01N 2021/646; G06V 10/143; G06V 30/1429; G06V 2201/06; G06V 10/22; G06V 10/993; G06V 10/25; G06V 10/751; G06T 2207/10064; G06T 2207/30108; G06T 2207/30141; G06T 2207/30148; G06T 2207/30164; G06T 7/0004; G06T 7/001; G06T 7/0008; G06T 7/0006; G06T 7/62; G06T 7/90; G06T 7/50; G06T 7/60; G06T 7/514; A61B 1/043; G06K 9/00
See application file for complete search history.

(56) References Cited

U.S. PATENT DOCUMENTS

| | | | | |
|---|---|---|---|---|
| 6,737,102 | B1* | 5/2004 | Saidman | B05C 5/02 427/208 |
| 6,973,931 | B1* | 12/2005 | King | A41G 5/0086 132/201 |
| 9,626,754 | B2* | 4/2017 | Chu | G06K 9/4661 |
| 9,645,092 | B2* | 5/2017 | Lowe | C09J 5/06 |
| 9,806,431 | B1* | 10/2017 | Izadian | H01Q 13/10 |
| 2006/0254511 | A1* | 11/2006 | Puffe | B05C 5/02 118/713 |
| 2010/0007733 | A1* | 1/2010 | Bachem | G01B 11/24 348/143 |
| 2012/0032977 | A1* | 2/2012 | Kim | G06T 19/006 345/633 |
| 2015/0027618 | A1* | 1/2015 | Orsini | B32B 41/00 156/64 |
| 2018/0119359 | A1* | 5/2018 | Gorden | D21H 21/146 |
| 2018/0339448 | A1* | 11/2018 | Fan | B29C 64/129 |
| 2020/0005105 | A1* | 1/2020 | Herranen | B42D 25/378 |
| 2020/0105552 | A1* | 4/2020 | Muhr | H01L 21/67253 |
| 2020/0326176 | A1* | 10/2020 | Tokida | G01B 11/02 |

OTHER PUBLICATIONS

Machine translation via Search of CN-107528013-A to Qiu et al., 13 pages. (Year: 2022).*
Stevens et al., Multiscale Structure of the Underwater Adhesive of Phragmatopoma Californica: a Nanostructured Latex with a Steep Microporosity Gradient, Mar. 30, 2007 [retrieved: Jun. 8, 2022], Langmuir, vol. 23, Issue: 9, pp. 5045-5049. Retrieved: https://pubs.acs.org/doi/full/10.1021/la063765e (Year: 2007).*
International Search Report and Written Opinion of PCT/US2019/061322 dated Mar. 3, 2020.

* cited by examiner

IMAGE ANALYSIS OF APPLIED ADHESIVE WITH FLUORESCENCE ENHANCEMENT

BACKGROUND

A machine may be used to apply adhesive on a first object to secure it to a second object in a manufacturing process. In some manufacturing processes, a vision system is used to analyze whether components are properly assembled. In some cases, when the color of objects being assembled are similar, the vision system may not be able to accurately determine whether the components are properly assembled because the vision system may not be able to accurately determine the exact positioning of the assembled components or be able to discern where one component ends and another component begins.

The current disclosure aims to provide an improved technique for determining whether a manufacturing process is operating correctly. The current disclosure also aims to solve the problem of analyzing images where the object being imaged is not illuminated well. In addition, the current disclosure aims to solve the problem of analyzing images where an applied adhesive and the object on which the adhesive is applied are of a similar color.

SUMMARY OF DISCLOSURE

Systems and methods are described herein for analyzing the application of adhesives. In some aspects, an adhesive comprising a fluorescent property is applied to a component. The component is illuminated using one or more of wavelengths of light from a light source, wherein the adhesive is configured to absorb the one or more wavelengths of light and fluoresce in response. An image of the component is captured using a camera while the component is illuminated using the light source. One or more fluorescent characteristics are determined from the image and a state of the applied adhesive is determined based on the one or more fluorescence characteristics.

In some embodiments, the light source is an ultraviolet light source. In some embodiments, determining the one or more fluorescence characteristics comprises comparing the captured image to a sample image.

In some embodiments, determining the one or more fluorescence characteristics comprises determining a fluorescence shape based on the image and determining whether the fluorescence shape is similar to an expected fluorescence shape. In some embodiments, in response to determining that the fluorescence shape is substantially similar to the expected fluorescence shape, determining that the adhesive is correctly applied, and in response to determining that the fluorescence shape is not substantially similar to the expected fluorescence shape, determining that the adhesive is incorrectly applied.

In some embodiments, determining the one or more fluorescence characteristics comprises determining a fluorescence level based on the image, and determining whether the fluorescence level in the image is similar to an expected fluorescence level. In some embodiments, in response to determining that the fluorescence level is substantially similar to the expected fluorescence level, determining that the adhesive is correctly applied, and in response to determining that the fluorescence level is not substantially similar to the expected fluorescence level, determining that the adhesive is incorrectly applied. In some embodiments, in response to determining that the fluorescence level is not substantially similar to the expected fluorescence level, determining that a composition of the adhesive is incorrect.

In some embodiments, determining the one or more fluorescence characteristics comprises determining a fluorescence location based on the image, and determining whether the fluorescence location is similar to an expected fluorescence location. In some embodiments, in response to determining that the fluorescence location is substantially similar to the expected fluorescence location, determining that the adhesive is correctly applied, and in response to determining that the fluorescence location is not substantially similar to the expected fluorescence location, determining that the adhesive is incorrectly applied.

In some embodiments, the camera is a first camera located at a first position and wherein the image is a first image. A second image is captured from a second camera located at a second position different than the first position and the first image and the second image are analyzed to determine a height profile of the applied adhesive.

In some embodiments, the adhesive and the component are a similar color. In some embodiments, the adhesive has a level of transparency.

In some embodiments, determining a state of the applied adhesive comprises comparing one or more characteristics of the image to one or more thresholds corresponding to the one or more characteristics. In some embodiments, determining the one or more fluorescence characteristics comprises determining one or more of a volume of the applied adhesive and a height profile of the applied adhesive.

In some embodiments, a first image is captured at a first time, a later image of the component is captured at a second later time, and the image and the later image are compared to determine a time-delayed characteristic of the component.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods described herein, add a fluorescent component to an adhesive to aid in analyzing whether the adhesive is applied correctly on a particular surface. In some embodiments, the applied adhesive, and the surface of application may be substantially similar in color. In such embodiments, conventional image analysis software may not be able to sufficiently distinguish between the applied adhesive and the surface. Thus, the image analysis software may not be able to properly deduce whether the adhesive was applied correctly.

In order to secure two components together, adhesive may be applied to the surface of one of the components and then the other component may be applied to the first component. To ensure proper attachment of the two components, the adhesive should be applied in a specific location and with a particular shape.

Figure 3:
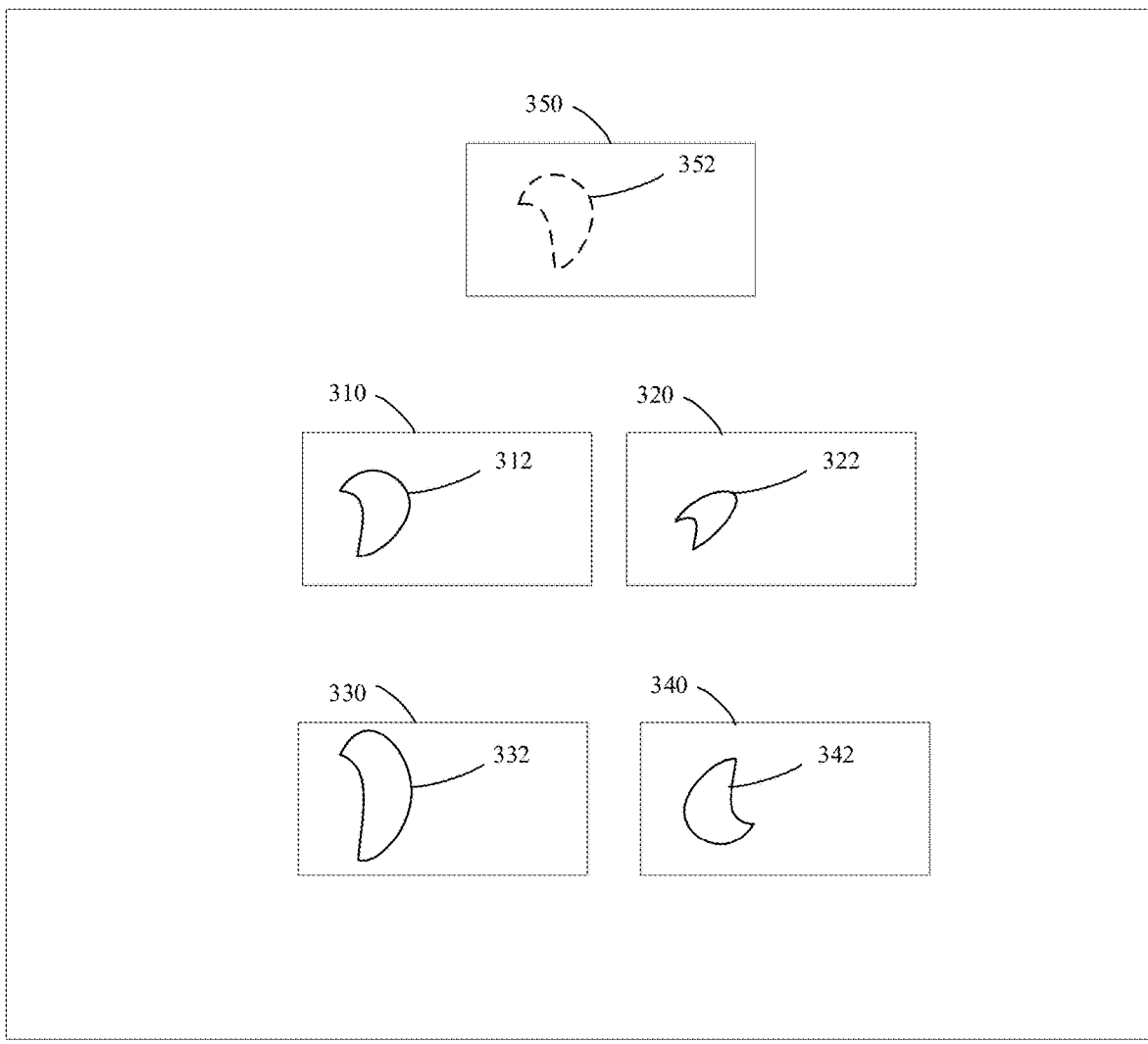
FIG. 3 depicts a panel of illustrative components and adhesive shapes, in accordance with some embodiments of the disclosure.

FIG. 3 depicts a panel 302 of illustrative components and adhesive shapes, in accordance with some embodiments of the present disclosure. Component 310 includes an applied adhesive 312. Applied adhesive 312 has a particular shape and it is located on the left side of component 310. Components 320, 330, and 340 are other illustrative components having respectively applied adhesives 322, 332, and 342. The shapes and locations of applied adhesives 312, 322, 332, and 342 all vary. During a manufacturing process, it may be difficult to repeatedly apply adhesive to components in the same location and shape. For example, the consistency of the adhesive may vary within an adhesive batch and may vary over time as the adhesive hardens. As another example, different amounts of residual adhesive may remain on an adhesive dispersal nozzle between applications. This may cause the shape and location of applied adhesive to be different for each adhesive application. The shapes and locations of the applied adhesives can be analyzed to determine whether they are properly applied. In some embodiments, the applied adhesives are compared to one or more sample shapes. Panel 302 includes sample component 350 having a sample adhesive shape 352. Applied adhesives 312, 322, 332, and 342 can be compared to sample adhesive shape 352 to determine whether the shapes are similar to sample shape 352. Applied adhesives sufficiently similar to sample shape 352 may be determined to be properly applied.

In some embodiments, comparing the applied adhesives to the sample shape may involve performing a pixel by pixel comparison, or a comparison of the dimensions of sample shape 310 to the dimensions of applied adhesives 312, 322, 332, and 342.

In some embodiments, the components depicted in panel 302 are images taken of the components while a light source is turned on to cause the adhesive to fluoresce. In some embodiments, the comparison of the applied adhesives to the sample shape includes comparing the color of the adhesive with the color of the sample shape. The color of the applied adhesive indicates the amount of fluorescence or the fluorescence level. The fluorescence levels may need to be sufficiently similar to the fluorescence level of the sample shape in order to determine that the adhesives were properly applied.

In some embodiments, of applied adhesives 312, 322, 332, and 342, only one adhesive (i.e., applied adhesive 312) may be sufficiently similar to a sample image of sample adhesive shape 352 to be considered properly applied.

In some embodiments, of applied adhesives 312, 322, 332, and 342, only one adhesive (i.e., applied adhesive 312) may be sufficiently similar to sample image 352 to be considered properly applied.

Figure 1:
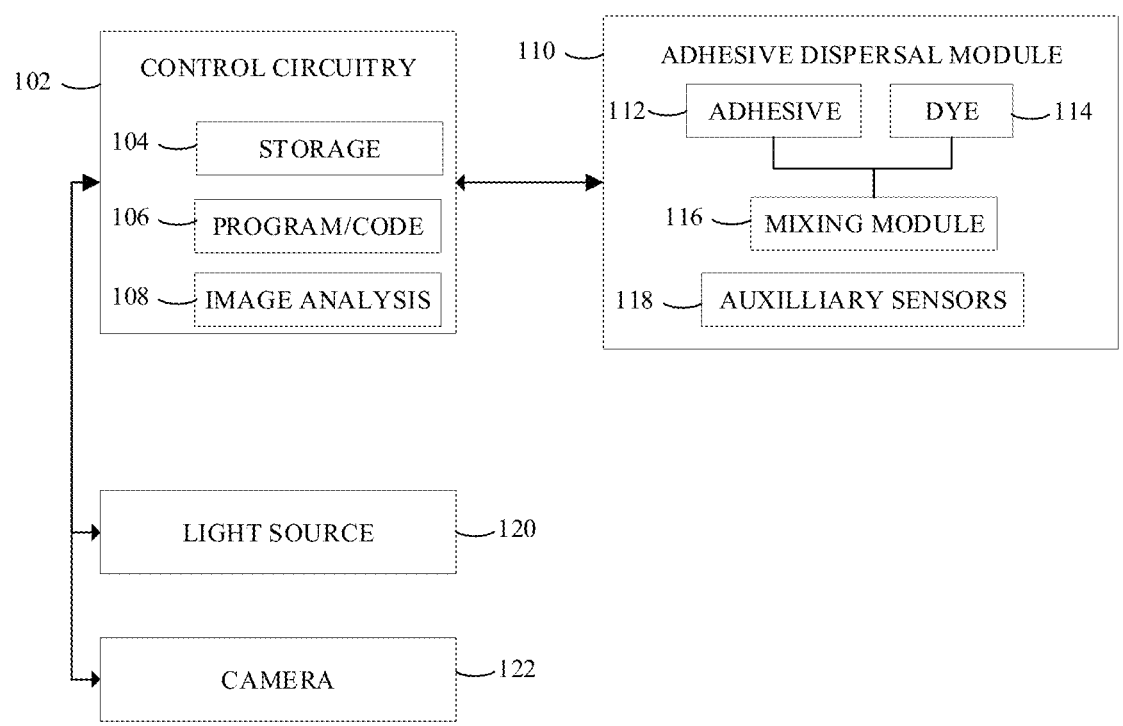
FIG. 1 depicts a block diagram of an apparatus to apply adhesive on a first object, in accordance with some embodiments of the disclosure.

FIG. 1 depicts a block diagram of an apparatus to apply adhesive on a first object, in accordance with some embodiments of the disclosure. FIG. 1 depicts a control circuitry 102 that includes a storage 104, a program/code module 106 and an image analysis module 108. In some embodiments, program/code module 106 includes instructions for controlling various portions of the apparatus. For example, program/code module 106 includes instructions that control the adhesive dispersal module 110. In some embodiments, program/code module 106 may communicate with all other elements of the system 100 such as adhesive dispersal module 110, light source 120, and camera 122. In some embodiments, components of program/code module 106 may require updating if the system is determined to be functioning incorrectly.

Adhesive dispersal module 110 is responsible for applying adhesive on a surface. Adhesive dispersal module 110 includes adhesive 112 and dye 114. In some embodiments, the dye may be colored or transparent. In some embodiments, the dye may contain fluorescent components that may be illuminated by a certain wavelength of light (e.g. UV light). Mixing module 116 is responsible for mixing the adhesive and dye together. Control circuitry 102 may instruct mixing module 116 to mix a predetermined portion of adhesive 112 with a fixed quantity of dye 114. In some embodiments, the amount of adhesive 112 and dye 114 to be mixed together, may be programmed by the user in program/code module 106 of control circuitry 102. In some embodiments, the amount of adhesive 112 and dye 114 to be mixed together, may be modified based on a level of fluorescence detected from an image of applied adhesive. In some embodiments, the amount of dye and adhesive to be mixed, may be based on a color of the adhesive 112 or a color of the dye 114. In some embodiments, the adhesive is a two-part adhesive (e.g., a resin and a hardener) and dye 114 is included in one of the two parts. In such embodiments, mixing module 116 mixes the resin and hardener together and as a result also mixes dye 114 in the adhesive.

Adhesive dispersal module may also include auxiliary sensors 118. In some embodiments, auxiliary sensors 118 may keep track of a correct positioning of a surface before applying adhesive. For example, auxiliary sensors 118 may include sensors that record a conveyor belt that carries multiple components to be placed under adhesive dispersal module 110 for adhesive to be applied. In this example, auxiliary sensors 118 may include a motion sensor, and only when control circuitry 102 receives an indication from the auxiliary sensors 118 that the conveyor belt carrying the components has come to a complete halt, will control circuitry 102 instruct adhesive dispersal module to apply adhesive on a surface of a component. In some embodiments, auxiliary sensors 118 may include sensors that keep a track of quantities of adhesive 112 and dye 114 in adhesive dispersal module 110. In this embodiment, auxiliary sensors 118 may instruct control circuitry to pause application of adhesive until the adhesive 112 or dye 114 are replenished.

Control circuitry 102 controls light source 120 and camera 122. Light source 120 is used to illuminate a region of a surface containing applied adhesive. For example, after adhesive dispersal module 110 completes applying adhesive on a surface, auxiliary sensors 118 may inform control circuitry 102 of the completion of the process of application of adhesive. Control circuitry 102 may then instruct light source 120 to illuminate the applied adhesive. Once light source 120 is turned on to illuminate the applied adhesive, control circuitry 102 may ask camera 122 to capture an image of the region with applied adhesive.

In some embodiments, captured images of applied adhesive on surfaces are stored in storage 104, which is a part of control circuitry 102. Captured images are analyzed by image analysis module 108. For example, control circuitry 102 may use image analysis module 108 to determine one or more fluorescence characteristics from the captured image. In some embodiments, fluorescence characteristics may include a shape of the fluorescence, location of the fluorescence, and fluorescence level.

In some embodiments, determining whether the adhesive is correctly applied may include image analysis module 108 determining a shape of fluorescence from the captured image. Determining a fluorescence shape by image analysis module 108 may involve any suitable object recognition technique. In some embodiments, image analysis module 108 may compare the detected fluorescence image from the captured image to an expected fluorescence shape stored on storage 104. In some embodiments, the expected fluorescence shape may be a sample image stored on storage 108 by a user.

In some embodiments, the expected fluorescence shape may be a collection of measurements, that indicate expected dimensions of the applied adhesive. In such embodiments, image analysis module 108 may determine measurements of the fluorescent portion of the captured image, and compare the determined measurements to the stored expected dimensions of applied adhesive. For example, the expected shape may be a circle with a particular radius. The radius of the shape of the applied adhesive may be compared with the expected shape to determine whether the shape of the applied adhesive is similar to the expected shape.

In case the image analysis module 108 determines that the shape of the applied adhesive in the captured image is substantially similar to the expected fluorescence shape, image analysis module 108 informs program code 106 of control circuitry 102 that the shape of fluorescence of the applied adhesive is correct.

In case the image analysis module 108 determines that the shape of the applied adhesive in the captured image is not substantially similar to the expected fluorescence shape, image analysis module 108 informs program code 106 of control circuitry 102 that the adhesive is incorrectly applied by adhesive dispersal module 110. In some embodiments, upon determining that the adhesive is incorrectly applied, program/code 106 of control circuitry 102 may stop the manufacturing process in order to determine and fix the problem with the application of the adhesive. In some embodiments, control circuitry 102 may recalibrate movement of adhesive dispersal module 110.

In some embodiments, determining whether the adhesive is correctly applied may include determining an amount of fluorescence in the captured image. Image analysis module 108 may determine a fluorescence level of the fluorescent region of the image. For example, image analysis module 108 may determine the fluorescent level in terms of color detected from the captured image. In some other examples, given other parameters, control circuitry 102 may determine a fluorescent level of the fluorescent region using units of 'lux' (lx), which is used to measure illuminance of a surface. The unit lux is a derivative of a lumens (L), which is a measure of the total quantity of light emitted by a surface, which may also be used in some examples to quantify a fluorescent level of the fluorescent region. Image analysis module extracts an expected fluorescence level from storage 104. The expected fluorescence level may be stored as a measurement in a unit like color, lux, lumen, candela, or other units. In some embodiments, image analysis module 108 may compare the detected fluorescence level from the captured image to the expected fluorescence level stored in storage 108.

In some embodiments, the expected fluorescence level may be stored as an expected color. Image analysis module 108 may compare the expected color to a color determined from the fluorescent portion of the captured image. For example, the expected color may be encoded as a red, green, blue value that ranges between 0 and 255. Image analysis module 108 may compare the expected color to a color determined in the captured image. Image analysis module 108 may encode the determined color in the same red, green, and blue values for ease of comparison.

When image analysis module 108 determines that the fluorescence level determined of the captured image is substantially similar to the expected fluorescence level (e.g., less than a threshold amount away from the expected values) stored in storage 104, image analysis module 108 informs program/code module 106 that the amount of fluorescence of the adhesive is correct. In case image analysis module 108 determines that the fluorescence level in the captured image is not substantially similar to the expected fluorescence level in storage 104, image analysis module 108 informs program/code module 106 that that the adhesive is incorrectly applied.

In some embodiments, program/code module 106, upon determining that the fluorescence of the captured image is not similar to the expected fluorescence level, may infer that the composition of adhesive in mixing module 116 is incorrect. In some embodiments, mixing module 116 may have mixed too little dye with the adhesive 112 which may lead to the detected fluorescence of the captured image by camera 122 be lower than the expected fluorescence value stored on storage 104. In such cases, program/code module 106 may instruct mixing module 116 of adhesive dispersal module 110 to add more dye 114 to adhesive 112. The amount of dye to be added may be determined based on the determined fluorescence level of the captured image from image analysis module 108. For example, in case the determined level of fluorescence is 10 lumens, and the expected level of fluorescence is 25 lumens, program/code module 106 may be configured to increase dye 114 in adhesive 112 based on factors such as intensity of light source 120 and luminescence of dye 114.

Similarly, upon determining that the detected fluorescence in the captured image is more than the expected fluorescence, program/code module 106 may instruct mixing module 116 to reduce the amount of dye 114 mixed in adhesive 112 in the next batch of adhesive. In some embodiments, program/code module 106 may instruct mixing module 116 to reduce the quantity of dye mixed in adhesive 112 based on the difference between the detected fluorescence in the captured image to the expected fluorescence.

In some embodiments, determining a location of fluorescence may also include determining whether a portion of the fluorescence in the captured image is within a certain area. For example, image analysis module 108 may determine whether approximately 70% of fluorescence of a florescent region is within in a predetermined area of 3 square centimeter. The predetermined area may be stored in storage 104. The percentage of fluorescence may be determined by determining an area of fluorescence in the captured image and determining whether at least 70% of that area is within a predefined region. The predefined region may be programmed and stored in storage 104. For example, in some cases, the predetermined region may be a quadrant of a radius of 10 centimeters on the top left edge of the surface. In this example, if at least 70% of the applied adhesive is within the quadrant, image analysis module 108 may inform program/code module 106 that the adhesive is correctly applied. If 70% of the applied adhesive is not within the predefined quadrant, the adhesive was not properly applied.

In some embodiments, determining whether the adhesive is correctly applied may include image analysis module 108 determining a fluorescence location by determining a position of the fluorescent portion in the captured image with respect to the rest of the surface on which the adhesive is applied. Based on the stored expected location in storage 104, image analysis module 108 may determine whether the fluorescence location in the captured location is similar to the expected location in storage 104.

Image analysis module 108 may determine adhesive to be correctly applied if it is determined that the fluorescence location in the captured image is substantially similar to the expected fluorescence location in storage 104. When the fluorescence location is not substantially similar to the expected fluorescence location, image analysis module 108 may determine that the adhesive is incorrectly applied. Image analysis module 108 may convey this determination to program/code module 106.

In some embodiments, the image analysis module may determine the aforementioned fluorescence characteristics (e.g. location, fluorescence level, shape, area) by comparing the image of the surface with the applied adhesive to a sample image stored in storage 104. For example, image analysis module may perform a pixel by pixel comparison of the two images to determine which pixels are fluorescent and which are dark, thereby determining whether the adhesive is correctly applied and only the correct portions of the captured image are illuminated.

In some embodiments, image comparison may constitute comparing various portions of the two images separately. For example, image analysis module 108 may extract the fluorescent portion of the captured image and compare it to only an expected shape of fluorescence of the fluorescent portion of the sample image. In such examples, image analysis module may compare a portion of the captured image to a portion of the sample image to determine whether the shape of the applied adhesive is correct.

In some embodiments, the pixel by pixel comparison may compare the color of each pixel of the captured image to a corresponding pixel of the expected image. In some embodiments, control circuitry 102 may determine a color of each pixel and compare the determined color to a color range for that pixel. The color range may be stored in a database that has a color ranges for each pixel. In some embodiments, the database of color ranges for each pixel, may be stored in storage 104 instead of a sample image. When the color of a predetermined threshold number of pixels is not within the range specified in the database, control circuitry 102 may determine that there was something erroneous about the applied adhesive. For example, if 10% of the pixels of the captured image have colors that are not in the color range specified in the database, control circuitry 102 may determine that the applied adhesive is incorrect in application or composition. The color database containing the predetermined colors of each pixel may be manually programmed with color values by the user. In some embodiments, control circuitry 102 may determine the color of each pixel within the sample image and store them in storage 104 and compare the color of each pixel to the color of each pixel in the captured image.

In some embodiments, control circuitry 102 may determine a contour of the shape of the fluorescent portion of the image. Control circuitry 102 may be able to ascertain the outermost pixels of the fluorescent portion (e.g., by using an edge finding technique) to determine a shape of the fluorescent portion of the image. In such embodiments, the address of each pixel that is part of the contour of the fluorescent portion may be compared with a sample contour (e.g., in a sample image) to determine a shape of the fluorescent portion of the captured image and compare it to the shape of the illuminated portion of the sample image. In some embodiments, the sample contour may have a predetermined thickness. The predetermined thickness may be a region of tolerance, that may indicate a region within which the contour must fit, in order for control circuitry 102 to determine the shape of the applied adhesive is substantially similar to a sample shape. Control circuitry 102 may superimpose the contour over the sample contour to determine if the contour fits within the tolerance region of the sample contour. When control circuitry 102 determines that the contour is not fully within the tolerance region, control circuitry 102 determines that the shape of the applied adhesive is not substantially similar and therefore is incorrect.

In some examples, control circuitry 102 may superimpose the contour over the sample contour and calculate a minimum distance between each point (e.g., pixel location) of the contour and the sample contour. In some embodiments, the sample contour may be represented by a predetermined number of points evenly distributed along the sample contour. In some embodiments, the predetermined number of points may be manually assigned or automatically assigned to the sample contour. In some embodiments, control circuitry 102 may compute a distance between each point of the contour and a corresponding nearest one of the predetermined points of the sample contour, after the contour is superimposed on the sample contour. When control circuitry 102 determines that a sufficient number (e.g., all or greater than 90%) of the computed distances are within an allowable distance, control circuitry 102 determines that the shape of the applied adhesive is substantially similar to the shape of the contour. Otherwise, control circuitry 102 determines that shape is incorrect. In the foregoing techniques, control circuitry 102 is able to ensure that a shape of the applied adhesive is within a certain admissible range.

In some embodiments, control circuitry 102 may also determine a variation in the color consistency of the fluorescent portion of the captured image. In such embodiments, if the variation in color in the fluorescent portion of the image is more than a particular amount, control circuitry 102 may determine that the adhesive is improperly mixed, or the quantity of dye or adhesive is incorrect.

In some embodiments, more than one camera 122 may be used to capture the image of the applied adhesive on a surface. In some embodiments, the different cameras may capture images of the illuminated portion of the component with the applied adhesive from different angles. In some embodiments, images from the first and the second camera may be put together to determine a height profile of the applied adhesive. For example, the captured images from different cameras positioned at different angles, may be combined with trigonometric formulae to determine a height profile of the applied adhesive. The height profile is another characteristic of the applied adhesive that may be used to determine whether a correct quantity of adhesive is applied on the surface. In some embodiments, the height profile may be integrated with the dimensions of the adhesive to determine a volume of applied adhesive on the surface of the component. The determined volume may be compared to one or more thresholds (e.g., upper and lower thresholds) to determine whether the volume of adhesive applied is correct.

In some embodiments, the applied adhesive may be clear and may not have any color associated with it under normal conditions. In such embodiments, image analysis module 108 may be able to correlate the fluorescence level produced by a clear adhesive to a volume of the adhesive applied. The fluorescence produced in the image may be sufficient to determine whether the fluorescence of the adhesive applied is substantially similar to a threshold fluorescence of the adhesive required to be applied on a surface.

In some embodiments, the nature of the adhesive may change after some time has passed since the adhesive is applied. In some embodiments, control circuitry 102 may instruct camera 122 to capture a first image at a first time and a second image of the surface at a second time, after the first time; and comparing the image and the later image to determine a time-delayed characteristic of the component. In some embodiments, the second camera may take a first image when the object is at a first position and a second image when the object is at a second position (e.g., the object may move along an assembly line) so that images are effectively taken from 2 different angles, which allows the volume to be determined in a similar way as the prior paragraph.

Figure 2:
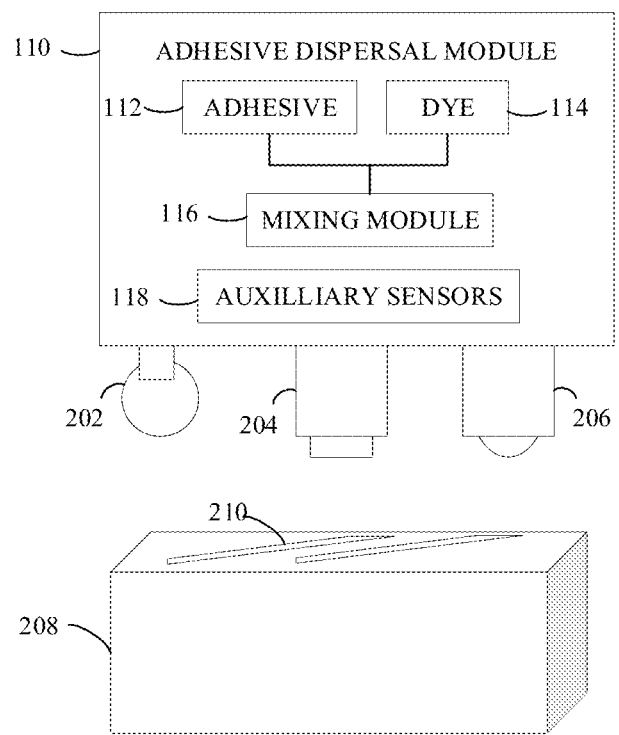
FIG. 2 depicts a diagram of an apparatus applying adhesive on a first object, in accordance with some embodiments of the disclosure.

FIG. 2 depicts a diagram of an apparatus applying adhesive on a first object, in accordance with some embodiments of the disclosure. FIG. 2 depicts the adhesive dispersal module 110 of FIG. 1 that dispenses an adhesive on object 208 upon receiving instructions from control circuitry 102. The adhesive dispersal module 110 also includes a nozzle 204 to dispense adhesive 210 on the object 208 placed under the adhesive dispersal module 110. The adhesive dispersal module 110 also has a light source 202 that may be used to illuminate the portion of the object 208 with the applied adhesive 210. Light source 208 may be configured or instructed by control circuitry 102 to emit a light of a particular wavelength (e.g., ultraviolet light). Adhesive dispersal module also has a camera 206 attached that may be instructed by control circuitry 102 to take one or more images of the portion of the object 208 with the applied adhesive 210. The components of the adhesive dispersal module 110 may be connected to the control circuitry 102 as described in connection with FIG. 1. The control circuitry 102 may be programmed to detect a shape, location, volume, and color of adhesive 210. In some embodiments, the adhesive dispersal module 110 may have more than one camera 206 attached to the dispersal module. In some embodiments, the components of FIG. 1 do not all need to be coupled to 110. The camera and light source can be positioned elsewhere, etc.

The systems and method of the present disclosure are useful in various manufacturing situations where adhesive is used. A first situation, for example, is when the surface on which the adhesive is applied has a color similar to the color of the adhesive. In this situation, it may be hard to determine whether the applied adhesive was correctly applied because it may be difficult to visually differentiate the adhesive from the surface. A second situation, for example, is when there are tight tolerances for the amount of adhesive that needs to be used and/or for the location of the applied adhesive. In such situations, determining a location and amount of adhesive may be challenging. A third situation, for example, is when the adhesive is applied on a component that is difficult to view or illuminate. A fourth situation, for example, is when a significant number of parts may need to be glued together and if a mistake is made, it is time consuming or expensive to fix. Accordingly, the process of applying an adhesive with a fluorescent component, which is activated when illuminated by a particular wavelength of light, allows for the easy detection of the applied adhesive. The easy detection of a shape, size, location, and other characteristics of the applied adhesive may be used to determine whether the adhesive is applied correctly, before placing a second component on the component. In some embodiments, the systems and methods are useful for manufacturing battery modules that contain multiple battery cells. For example, some battery modules, such as electric vehicle battery modules and power generation battery modules, use a large number of battery cells.

Figure 4:
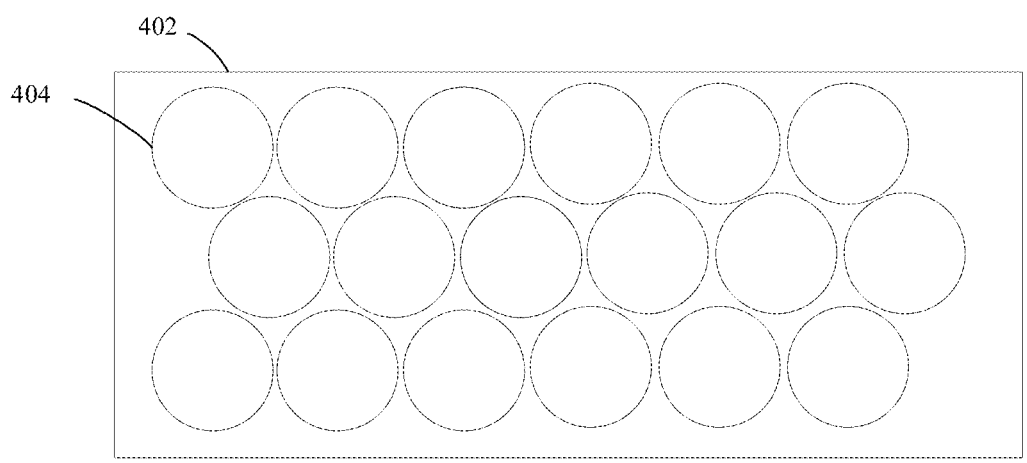
FIG. 4 depicts a collection of batteries glued on a surface, in accordance with some embodiments of the disclosure.

FIG. 4 depicts a collection of batteries glued on a surface, in accordance with some embodiments of the disclosure. FIG. 4 illustrates a practical application of the process of applying adhesive on a first surface, determining whether the adhesive is properly applied, and then placing batter cels placed on the correctly applied adhesive. Surface 402 is a base surface on which battery cells 404 are attached (e.g., an inside surface of a battery module enclosure). The number of battery cells 404 depicted in FIG. 4 are illustrative and any suitable number of battery cells may be used. For example, some common electric vehicles use between 300 and 500 battery cells in each module. In some embodiments, surface 402 may be the surface on which adhesive is applied. Upon determining that the adhesive is correctly applied, the battery cells 404 may be placed on surface 402. In some embodiments the adhesive may be applied all at once and before any battery cells 404 are mounted. In some embodiments, the adhesive may be applied to a single row or column at a time and then battery cells 404 of that row or column are mounted. In some embodiments, adhesive is applied for a single battery cell 404 at a time. This process allows the manufacturer to stop the process of manufacturing and fix a mistake that may have occurred in the application of adhesive and then continue to finish the battery module. This way, an entire battery module is not assembled before the mistake is identified. In some embodiments, the color of surface 402 and the color of the applied adhesive may be similar and control circuitry 102 may not be able to accurately or consistently discern a shape of the applied adhesive to determine whether the adhesive is applied correctly without the fluorescent component (e.g., dye 114) mixed with the adhesive.

Figure 5:
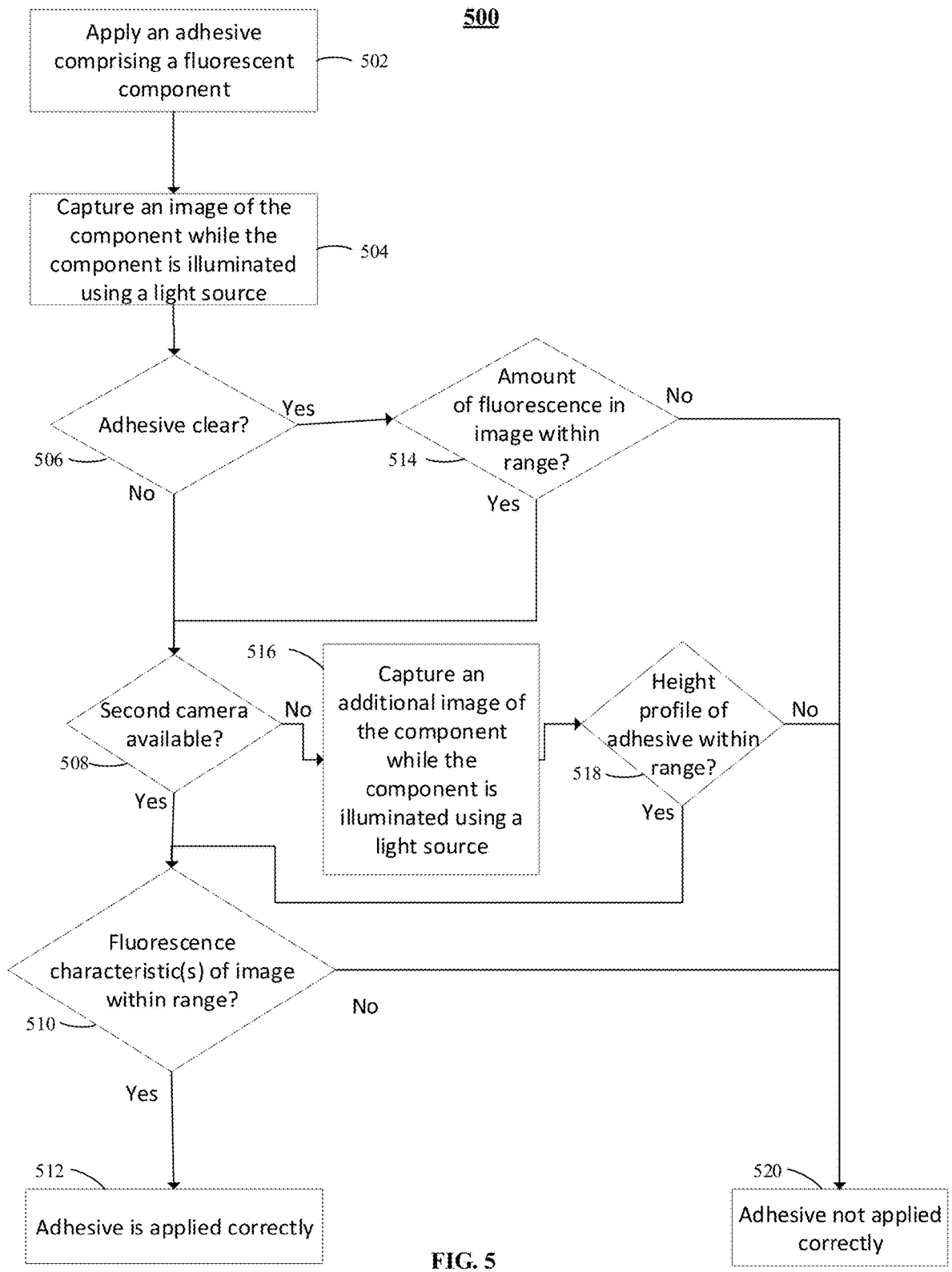
FIG. 5 depicts an illustrative flowchart of an exemplary process for applying adhesive on a surface, in accordance with some embodiments of the disclosure.

FIG. 5 depicts an illustrative flowchart of an exemplary process 500 for applying adhesive on a surface, in accordance with some embodiments of the disclosure. At 502, an adhesive (e.g., adhesive 112) comprising a fluorescent component (e.g., dye 114) is applied on a first object. For example, the adhesive may be applied using adhesive dispersal module 110.

At 504, an image of the component while the component is illuminated using a light source 120 is captured using a camera. For example, the image may be captured using camera 122.

At decision block 506, control circuitry (e.g., control circuitry 102) determines whether the applied adhesive is clear. In some embodiments, the type of adhesive may be input by a user to control circuitry 102. In some embodiments, the type of adhesive is received from the adhesive dispersal module. When the control circuitry determines that the adhesive is not clear, the process moves to decision block 508 to determine if a second camera is available. When the control circuitry determines that the adhesive is clear, the process moves to decision block 514 to determine whether the amount of fluorescent in the image within a range.

At decision block 514, the control circuitry determines whether the amount of fluorescence of applied adhesive is within a predetermined range. For example, the fluorescence level of the image may be measured in terms of the color recorded in the captured image. The color of the illuminated portion of the captured image may be encoded in an RGB format with red, blue, and green values ranging between 0 and 255. The color of the captured image may be compared to a range of values that may be fed into control circuitry 102 by a user, or may be extracted from colors captured from a sample image in storage 104. In some embodiments, when the amount of fluorescence is too little, not enough adhesive was applied at 502. In some embodiments, when the amount of fluorescence is too much, too much adhesive was applied at 502. When the amount of fluorescence is within range, the process proceeds to decision block 508 to determine whether a second camera is available. When the amount of fluorescence in the image is not within range, the process determines at 520 that the adhesive is incorrectly applied.

At decision block 508, the control circuitry determines whether a second camera is available. In some embodiments, the second camera is different than the first camera and captures an additional image of the component from a different angle. In some embodiments, the second camera is the first camera, where the first camera can capture an additional image when the component is at a second position (e.g., the component may move along an assembly line) so that the additional image is taken from a different angle than the first image. When a second camera is not available, the process proceeds to decision block 510 to determines whether the fluorescence characteristics of the image are within range. When a second camera is available, the process moves to 516 to capture an additional image.

At 516, the control circuitry captures an additional image of the component while the component is illuminated using a light source. The additional image may be captured by the first camera or a second camera. In some embodiments, the two images are taken from different angles. This allows a height profile and volume of the adhesive to be determined as described further above.

At decision block 518, the control circuitry determines whether the height profile of adhesive is within range. For example, the height profile may be compared against a lower height threshold and an upper height threshold. When the height profile is between the two thresholds, the height profile is within range. In some embodiments, the height profile is converted to a volume of adhesive and the volume of adhesive is compared to lower and upper volume thresholds to determine whether the height profile is within range. The height profile is another characteristic of the applied adhesive that may be used to determine whether a correct quantity of adhesive is applied to the component. When the height profile of adhesive is within a predetermined range, the process proceeds to decision block 510 to determine whether the fluorescence characteristics of the image are within range. When the height profile is determined to not be in range, the process proceeds to 520 to determine that the adhesive is incorrectly applied.

At decision block 510, the control circuitry 102 determines whether the fluorescence characteristics of the image are within range. When the fluorescence characteristics are determined to be in range, the process determines at 512 that adhesive is correctly applied. Fluorescence characteristics include a shape of fluorescence, a location of fluorescence, and an amount of fluorescence. In some embodiments, these characteristics are determined by a pixel by pixel analysis of the captured image. The control circuitry may have a record of the expected color of each pixel. The expected color of each pixel may be compared with the captured color of each pixel to determine whether the captured color of the pixel is within a threshold color range. Using this technique, the control circuitry may be able to confirm whether the shape of fluorescence, location of fluorescence, and the amount of fluorescence are within range all at once. When one or more parameters are not within a predetermined range, the control circuit may determine that the adhesive is incorrectly applied. When the fluorescence characteristics are determined to not be within range, the process determines at 520 that the adhesive is incorrectly applied.

It will be understood that process 500 of FIG. 5 is merely illustrative and any suitable modifications may be made in accordance with the present disclosure. For example, in some embodiments, the adhesive is colored and 506 and 514 may be omitted from process 500. As another example, in some embodiments, only a single image may be used and 508, 516, and 518 may be omitted. It will also be understood that any of the techniques described herein for determining fluorescence characteristics may be used at 510. In some embodiments, one, two, three, or more fluorescence characteristics are evaluated at 510. It will also be understood that when adhesive is not applied correctly at 520, any suitable corrective actions may be taken. Corrective actions can be automatically performed (e.g., when not enough adhesive was applied) or prompts may be provided to an operator.

The embodiments and examples discussed above are intended to be illustrative and not limiting. One skilled in the art would appreciate that components of the assemblies, and steps of the processes discussed herein may be omitted, modified, combined, and/or rearranged, and any additional components or steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and examples relating to one embodiment may be combined with any other embodiment in a suitable manner. It should also be noted that the systems and/or methods described above may be applied to, or used in accordance with, other systems and/or methods.

What is claimed is:

1. A method for analyzing application of an adhesive, comprising:
    applying the adhesive comprising a fluorescent property to a component;
    illuminating the component using one or more of wavelengths of light from a light source, wherein the adhesive is configured to absorb the one or more wavelengths of light and fluoresce in response;
    capturing an image of the component using a camera while the component is illuminated using the light source;
    determining one or more fluorescence characteristics from the image by;
        determining a fluorescence shape in the image;
        comparing the determined fluorescence shape to an expected fluorescence shape in a sample image stored in storage, the expected fluorescence shape indicating expected dimensions of the adhesive;
        determining a fluorescence level based on the image; and
        determining a volume of the applied adhesive based on the determined fluorescence level; and
    determining a state of the applied adhesive based on the one or more fluorescence characteristics by:
        determining whether the determined fluorescence shape is substantially similar to the expected fluorescence shape based on the comparing; and determining whether the determined volume is within a desired range based on a volume threshold.

2. The method of claim 1, wherein the light source is an ultraviolet light source.

3. The method of claim 1, further comprising:
in response to determining that the determined fluorescence shape is substantially similar to the expected fluorescence shape, determining that the adhesive is correctly applied; or
in response to determining that the determined fluorescence shape is not substantially similar to the expected fluorescence shape, determining that the adhesive is incorrectly applied.

4. The method of claim 1, wherein determining the one or more fluorescence characteristics further comprises:
determining whether the fluorescence level in the image is similar to an expected fluorescence level.

5. The method of claim 4, further comprising:
in response to determining that the fluorescence level is substantially similar to the expected fluorescence level, determining that the adhesive is correctly applied; or
in response to determining that the fluorescence level is not substantially similar to the expected fluorescence level, determining that the adhesive is incorrectly applied.

6. The method of claim 5, wherein:
in response to determining that the fluorescence level is not substantially similar to the expected fluorescence level, determining that a composition of the adhesive is incorrect.

7. The method of claim 1, wherein determining the one or more fluorescence characteristics further comprises:
determining a fluorescence location based on the image; and
determining whether the fluorescence location is similar to an expected fluorescence location.

8. The method of claim 7, further comprising:
in response to determining that the fluorescence location is substantially similar to the expected fluorescence location, determining that the adhesive is correctly applied; or
in response to determining that the fluorescence location is not substantially similar to the expected fluorescence location, determining that the adhesive is incorrectly applied.

9. The method of claim 1, wherein the camera is a first camera located at a first position and wherein the image is a first image, the method further comprising:
capturing a second image from a second camera located at a second position different than the first position; and
analyzing the first image and the second image to determine a height of the applied adhesive.

10. The method of claim 9, further comprising determining whether the height is within a desired range based on a height threshold.

11. The method of claim 1, wherein the adhesive and the component are a similar color.

12. The method of claim 1, wherein the adhesive has a level of transparency.

13. The method of claim 1, wherein determining a state of the applied adhesive further comprises comparing one or more characteristics of the image to one or more thresholds corresponding to the one or more characteristics.

14. The method of claim 1, further comprising:
capturing the image at a first time;
capturing a later image of the component at a second time, wherein the second time is after the first time; and
comparing the image to the later image to determine a time-delayed characteristic of the component.

15. A system for analyzing an adhesive, comprising:
an adhesive dispersal module, wherein the adhesive dispersal module contains the adhesive comprising a fluorescent property;
a light source configured to emit one or more wavelengths of light, wherein the adhesive is configured to absorb the one or more wavelengths of light and fluoresce in response;
a camera; and
control circuitry configured to:
cause the adhesive dispersal module to apply the adhesive to a component;
cause the light source to illuminate the component with the one or more wavelengths of light;
cause the camera to capture an image of the component while the component is illuminated using the light source;
determine one or more fluorescence characteristics based on the image in a measurement unit by:
determining a fluorescence shape in the image;
comparing the determined fluorescence shape to an expected fluorescence shape in a sample image stored in storage, the expected fluorescence shape indicating expected dimensions of the adhesive;
determining a fluorescence level based on the image;
determining a volume of the applied adhesive based on the determined fluorescence level; and
determine a state of the applied adhesive based on the one or more fluorescence characteristics by:
determining whether the determined fluorescence shape is substantially similar to expected fluorescence shape based on the comparing; and
determining whether the determined volume is within a desired range based on a volume threshold.

16. The system of claim 15, wherein the camera is a first camera located at a first position and wherein the image is a first image, the system further comprising:
a second camera located at a second position different than the first position that captures a second image; and
the control circuitry is further configured to analyze the first image and the second image to determine a height of the applied adhesive.

17. The system of claim 16, wherein the control circuitry is further configured to determine whether the height of the adhesive is within a desired range based on a height threshold.

18. The system of claim 15, wherein the light source is an ultraviolet light source.

19. The system of claim 15, wherein the control circuitry is further configured to:
determine a fluorescence consistency within a region of the image;
determine whether the fluorescence consistency is similar to an expected fluorescence consistency; and
in response to determining that the fluorescence consistency is not similar to the expected fluorescence consistency, causing the adhesive dispersal module to remix the adhesive in the adhesive dispersal module.

* * * * *